United States Patent [19]

Zusy

[11] Patent Number: 4,928,816
[45] Date of Patent: May 29, 1990

[54] APPARATUS FOR MANIPULATING COMPACT DISC JEWEL BOXED

[76] Inventor: Matthew S. Zusy, 1202 Brookview Blvd., Parma, Ohio 44134

[21] Appl. No.: 276,944

[22] Filed: Nov. 28, 1988

[51] Int. Cl.$^5$ .............................................. B65D 85/57
[52] U.S. Cl. .................................... 206/232; 81/3.07; 206/309; 211/40; 220/284
[58] Field of Search ................. 81/3.07; 206/216, 232, 206/307, 309, 310–313; 211/40, 41; 312/13; 369/273, 289; 220/284, 260

[56] References Cited

U.S. PATENT DOCUMENTS

| | | | |
|---|---|---|---|
| 3,144,943 | 8/1964 | Punt | 211/40 |
| 3,897,871 | 8/1975 | Zinnbauer | 211/41 |
| 4,465,197 | 8/1984 | Grilliot | 211/40 |
| 4,714,157 | 12/1987 | Morrone | 206/309 |
| 4,765,469 | 8/1988 | Seifert | 211/41 |

FOREIGN PATENT DOCUMENTS 2098176  11/1982  United Kingdom ................ 220/284

*Primary Examiner*—Jimmy G. Foster
*Attorney, Agent, or Firm*—Donald A. Bergquist

[57] ABSTRACT

A unit for providing easy manipulation of a compact disc case from a closed to open position and back, allowing simple access to the compact disc, requiring only one hand to operate. The unit clasps the compact disc case by means of four latches that engage four slots on the compact disc case cover. The four latches accept the compact disc case by a skewed face and engage the slots by a spring bias of the latches. The locked position allows easy opening of the compact disc case. The removal of the compact disc case from the unit is allowed by the beveled edge of the latches, forcing the latches to retract when the compact disc case is pulled in a direction lateral to the insertion of the compact disc case. By means of this structure, the compact disc case can be opened with one hand, allowing quick and easy acccess to the compact disc and the literature booklet. The advantages being a convenience in some circumstances and a neccessity in other circumstances (I.E. to a user operating an automobile, people lacking some manual dexterity and people limited to the use of one hand).

16 Claims, 4 Drawing Sheets

APPARATUS FOR MANIPULATING COMPACT DISC JEWEL BOXED

BACKGROUND OF THE INVENTION

1. Field of the Invention

This invention relates to an accessory for digital compact discs and in particular to a manipulator of the protective storage case for the compact disc known as the jewel box.

2. Background of the Invention

In recent years, the compact disc has established itself as a practical storage unit for large amounts of digital information. The most popular use of the compact disc is in conjunction with digital audio compact disc players which process the digital information into the highest quality sound reproduction of any recording medium. The compact disc is also widely used for storage of data for use in personal computers. One of the key advantages of the compact disc is its durability, resulting in a long expected life.

The manufacturers of compact discs recommend that the information playback side be kept clear of dirt and other soiling and abrasive elements which might impede the laser optic reader of the compact disc player. The jewel box provides this protection by means of a holding member which secures the compact disc through the central aperture therein. The base on which the compact disc rests does not come into contact with the recorded information portion of the playback side. This leaves that portion free from any contact. The jewel box also prevents damage of the compact disc by means of its rigid embodiment.

The jewel box is an attractive package that also makes visible to the user information regarding the compact disc being stored within. When a plurality of jewel boxes are stored face to face, the user can easily observe the various titles displayed on the edge of each box. When the preferred compact disc is selected, the user can find more information on the compact disc by referring to the back side of the jewel box or by reading the literature booklet on the inside of the cover. The jewel box however, has restricting elements that deny the user of simple access to the contents of the jewel box.

When the jewel box is closed, the cover and body are flush with respect to each other, making it difficult to open the jewel box.

Typically, the user will unwittingly grip both the cover and the body with the same finger thereby tending to defeat or inhibit the opening of the box. The thinness of the jewel box adds to this problem. Also, The cover has a tendency to stick to the body at the notch and recess fastener that is used between the cover and body to keep the box closed. While trying to open the jewel box, these two circumstances can cause a person to apply unnecessary pressure to the jewel box, resulting in the cover releasing unexpectedly from the body. The hinges on the jewel box would receive sharp stress from this action. In many cases the hinge extension on the cover will break from this stress. Furthermore, the jewel box might be dropped because of this action, resulting in damage to both the jewel box and compact disc. As a result of the difficulty in opening the jewel box, the jewel box tends to have a shorter life span than what is anticipated for the compact disc. No other art is directly related to solving the problems discussed.

The problems of opening the jewel box are common to people using two hands. The use of one hand to manipulate the jewel box is even more difficult and awkward. Some of the problems discussed can be considered an inconvenience but there are circumstances when the problematic accessibility of the compact disc stored in the favored jewel box deters the use of the compact disc. Those in the profession of playing recorded music, either at social events or on the radio, may be dissuaded from using the preferred storage means by the inconvenience described especially that involving one-handed operation.

When the user is handicapped, not having the full use of hands or fingers, the jewel box can dissuade the user from the compact disc field. The manipulation of the jewel box by arthritic hands can also be most difficult. The use of the jewel box by the user operating an automobile is obviously difficult in that at least one hand should be free for steering the vehicle.

SUMMARY OF THE INVENTION

The present invention overcomes the above-discussed problems of the jewel box by providing a novel and practical device to the user of compact discs in any environment. The advantages of the invention are allied with the known advantages of the jewel box, combining to nullify any advantages of other art in the field of compact disc protection, storage, and accessibility.

One of the objects of the invention is to overcome the problems of access to the compact disc through the jewel box by means of a structure into which the jewel box is easily inserted and by which it is held at the cover with a positive and firm action. The jewel box can then be opened by applying light pressure to the edge of the cover or by pushing the compact disc holding body away from the cover. The jewel box is held firmly allowing easy extraction and return of the compact disc from the holding body by known means. After the use of the compact disc, the jewel box is closed and then easily released from the gripping latches by easily pulling the jewel box from the invention.

Another object of the invention is to provide for a handicapped person easy access to the compact disc which access was never before offered. Only two digits are required to operate the invention further substantiating the advantages of the invention, especially to people lacking manual dexterity.

Another object of the invention is to provide easy access to the compact disc to users operating an automobile. The invention does not require the driver to take both hands off the steering wheel to open the jewel box and pull out the compact disc. This eliminates the possible danger involved in wrestling with the jewel box or any other compact disc storage art for that matter. The only visual obligation to the operation of the invention is during the insertion of the jewel box into the invention. The other operations can be accomplished by feel. This relieves the vision to the operation of the automobile.

A further object of the invention is to limit the strain and damage incurred on the jewel box with regular use. The invention accepts and locks the jewel box positively without tension or abrasion to the surface. The position of the jewel box lets it fall open without the unnecessary pressure and surprise release of the closure fastener. When the jewel box is open, the compact disc holding body rests on supports under the front edge and at the hinged edge. These two circumstances relieve the fragile hinges of strain under normal use.

By holding the jewel box while the compact disc is in use, the invention retains the jewel box, thereby eliminating the possibility of damage or misplacement of the jewel box particularly in an open environment. The invention also holds the jewel box up and away from soiling elements which could be transmitted to the compact disc

BRIEF DESCRIPTION OF DRAWINGS

For a complete understanding of the principals of the invention, one should refer to the illustrated embodiment in the accompanying drawings. In the drawings.

DETAILED DESCRIPTION OF DRAWINGS AND A PREFERRED EMBODIMENT

Figure 1:
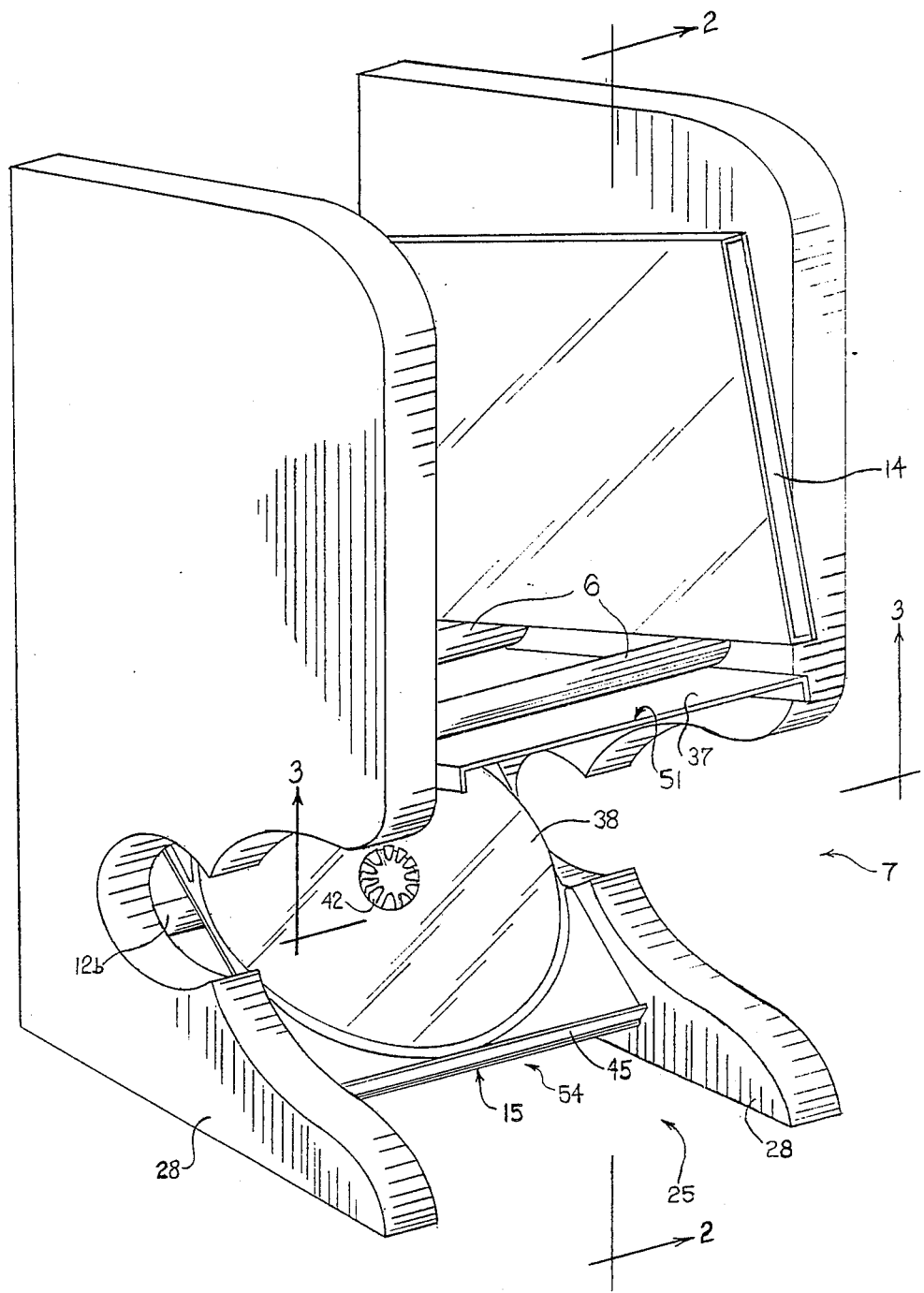
FIG.1 is a perspective view of a jewel box opener with a storage shelf.

Turning now to the drawings, FIG. 1 shows the preferred embodiment with a compact disc case storage area. Two horizontal dowels 6 define the shelf for vertically stored face to face jewel boxes with one jewel box 14 demonstrating the placement position. The open jewel box 15 is secured into position for the extraction and return of the compact disc 38. The upright facing side boards 28 are constructed of wood in the preferred embodiment and define an area between them for the jewel boxes. Elongated horizontal dowels of wood construction interconnect the side boards 28 having ends fastened through holes on the side boards 28. The unit is open at the front 25 for the easy placement of the jewel box 15 into the invention. The opening 7 on the side boards 28 provide space for a hand to span the circumference and grasp around the compact disc 38. Two horizontal dowels 6 define by their top surface a shelf, which may be slightly inclined from the horizontal, for the storage of compact discs, and by their bottom surface a ceiling, which may be slightly inclined from the horizontal, against which ceiling the jewel box cover 37 comes into contact when the jewel box 15 is inserted. The open areas of the front 25 and the sides 7 also provide visibility of the compact disc 38 and the jewel box 15. The literature booklet 39, shown in FIG. 3, is easily accessible by known means, which is to slide it out the lip end of the jewel box cover 37.

Figure 2:
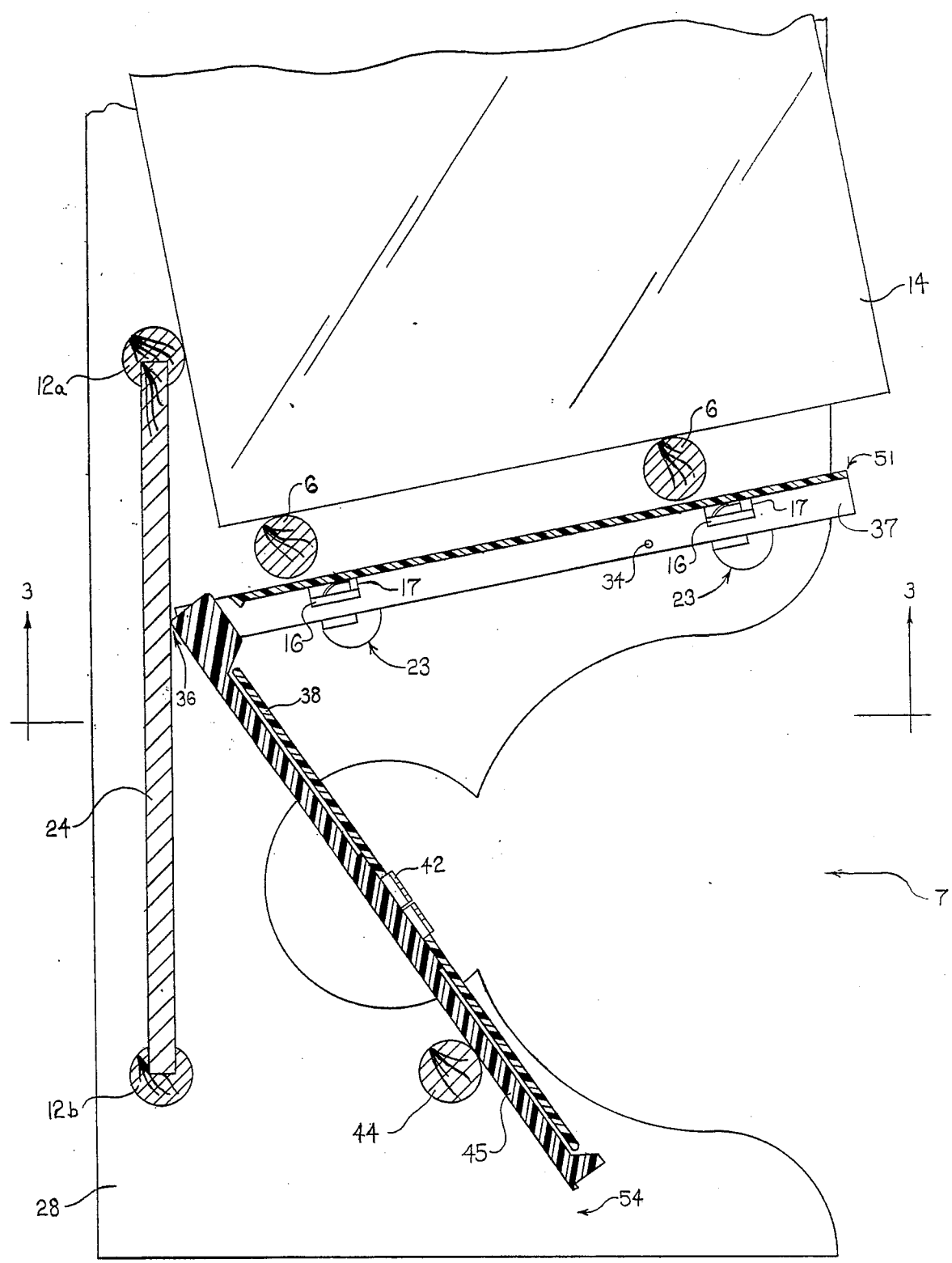
FIG.2 is an enlarged sectional view taken along line 2—2 in FIG.1.
Figure 3:
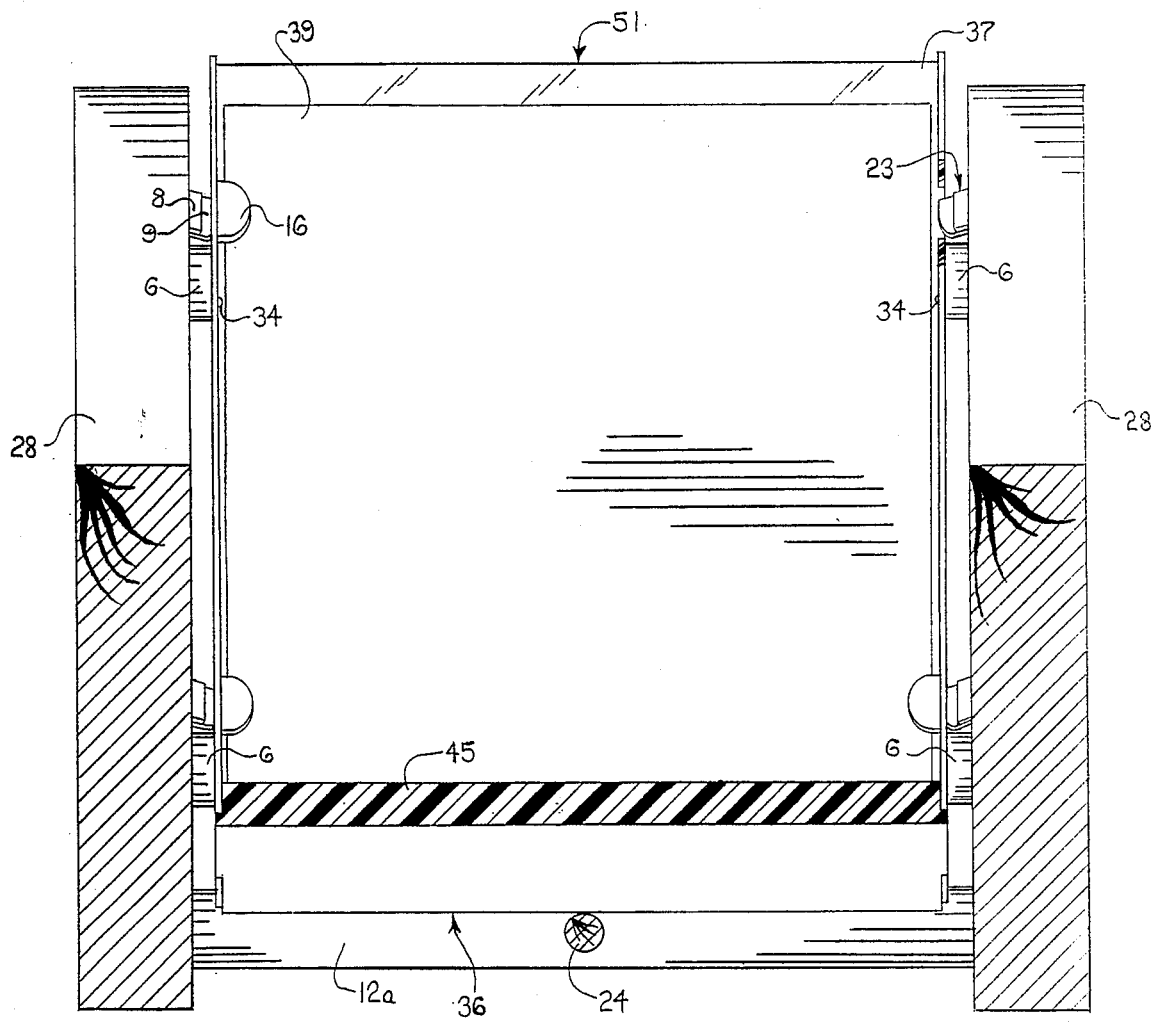
FIG. 3 is an enlarged sectional view taken along line 3—3 in FIG.1.

Two latch assemblies 23 are incorporated in each board 28 and are oppositely disposed as seen in FIG. 3. The latch assemblies 23 act as catch members to grip the jewel box cover 37, by engaging the slots 17 thereof. FIG. 2 partially reveals two of the latch assemblies aligned with the two slots 17 on the side of the jewel box cover 37. This aligning is provided when the rear edge 36 of the jewel box body 45 makes contact with the back vertical guide dowel 24 and the jewel box cover 37 is facing the ceiling. The back guide dowel 24 is situated near the rear and has ends connected with two horizontal dowels 12a and 12b. The upper horizontal dowel 12a acts as a back stop of the stored jewel box 14. The jewel box body 45 rests on a horizontal support dowel 44 during the extraction of the compact disc 38 from the compact disc holding member 42. The jewel box 15 rests at this position until the compact disc 38 is returned and the jewel box 15 is closed and withdrawn from the invention. A space 54 underneath the jewel box body 45 allows the hand to reach under and lift the jewel box body 45 to the closed position.

Figure 4:
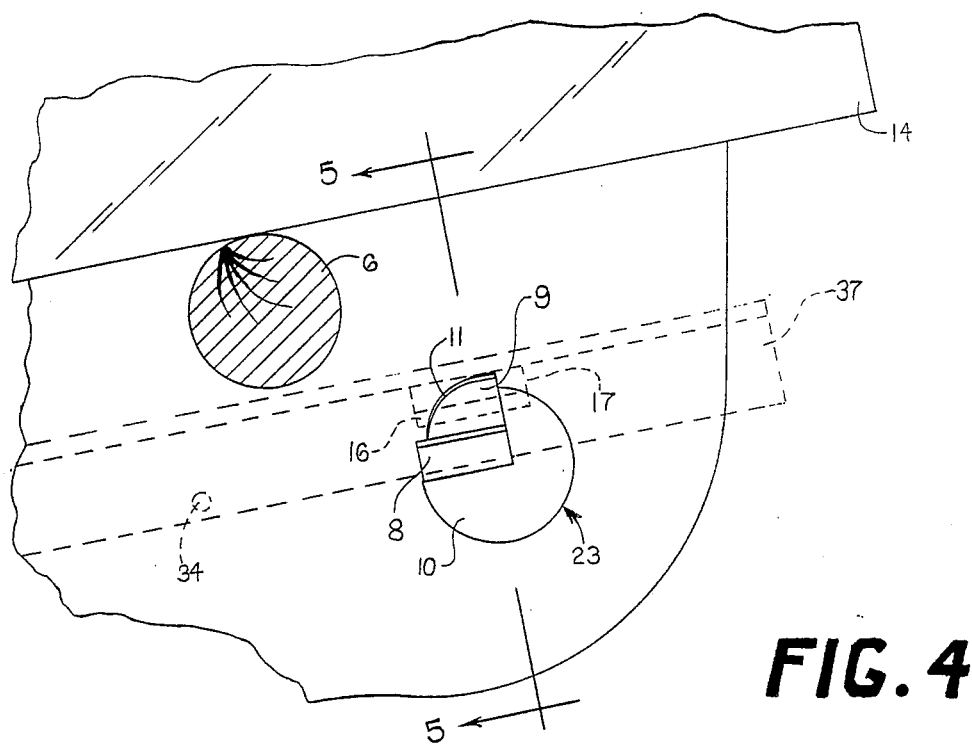
FIG. 4 is an enlarged cutout view of a latch assembly from FIG. 2 with a ghost of the jewel box cover.
Figure 5:
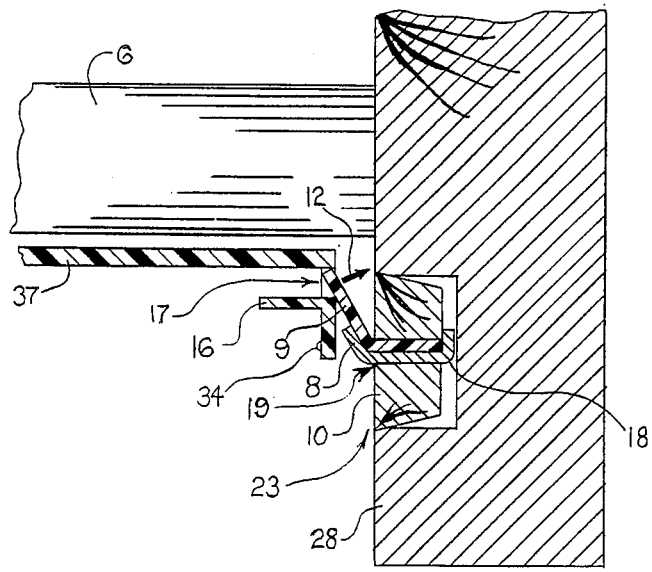
FIG. 5 is a sectional view taken along line 5—5 of FIG. 4.

In practice, all jewel boxes have the four slots 17 situated at the same location directly above the literature booklet shelves 16. FIGS. 4 and 5 reveal the edges of the latch assemblies 23 in the slots 17.

The latch assemblies 23 are composed of a flexible plastic clip 9 backed by a rigid metal support 8, both of which are cooperatively secured to the side boards 28 with the use of a wood plug 10. FIG. 5 reveals the tapered wood plug 10 with a slot 19 through the length thereof which slot 19 accommodates the flexible clip 9 and the rigid support 8. The plug 10 is wedged into a hole on the side wall 28 where it is snugly secured by an interference fit. This fit in turn provides a tight clamp on the flexible clip 9 and the rigid support 8. The "L"-shaped bend 18 of the back of the rigid support 8 secures the rigid support 8 against pullout. The depth of the slot 19 in the plug 10 is short of severing the plug 10, allowing construction of the latch assemblies 23 with the plug 10 remaining intact. The depth of the slot 19 is preferably at least the width of the rigid support 8 or the flexible clip 9 allowing the two stacked members to be contained within the circumference of the plug 10.

The rigid support 8 is angled upward toward the ceiling poles 6 where it extends from the inside of the side walls 28, as seen in FIG. 5. The flexible clip 9 is stacked atop the rigid support 8 with one edge against the inside "L"-shaped bend 18 of the rigid support 8. The flexible clip 9 is held angled upward by the rigid support 8 from where it extends on the inside of the side walls 28. The original state of the clip 9 was a flat strip of plastic. The angling of the clip 9 results in a spring bias to return to the original state. The flexible clip 9 sits in the cup of the rigid support 8 both being clamped together by the plug 10. The extended angled segment of the support 8 restricts the extended segment of the clip 9 from hyperextension back to the original flat state. The flexible clip 9 is self-supporting beyond the bend imposed upon it by the rigid support 8, and is sturdy enough to also support the forces applied during the use of the invention. The unsupported area of the flexible clip 9 will retract in a direction indicated by the arrow 12 as the jewel box 15 is inserted from below or as the jewel box 15 is extracted in a substantially horizontal direction. When the box 15 is properly seated against both the ceiling and the back vertical guide dowel 24, the spring bias of the clip 9 causes the clip 9 to engage the slot 17.

The distance between the opposite rigid supports 9 is wider than the width of the jewel box cover 37 shown in FIG. 3. The distance between the tips of the opposite flexible clips 9 is less than the width of the jewel box cover 37. This allows each flexible clip 9 to penetrate the slots 17 of the jewel box cover 37. In FIG. 5, the angle of the flexible clip 9 can be considered a beveled face which allows the jewel box cover 37 to be advanced toward the ceiling poles 6 forcing the flexible clip 9 to retract 12 toward the side wall 28. The angle of the rigid support 8 also guides the jewel box 15 to the flexible clips 9 if the jewel box cover 37 comes in contact with the rigid supports 8. The distance of the top edge of the flexible clip 9 to the ceiling poles 6, shown in FIG. 5, is larger than the height from the area above the slots 17 to the top surface of the jewel box cover 37. When the top surface of the jewel box cover 37 contacts the ceiling poles the top edge of the flexible clips 9 have passed the area above the slots 17 and have flexed into the slots 17.

The ceiling dowels 6 and the back guide dowel 24 cooperatively position the jewel box where the latch assemblies engage the cover 37 in the latched position. The jewel box 15 is now in the position to be opened.

By lightly applying downward pressure on the midportion of the top front lip 51 of the jewel box cover 37, the notch 34 and recess fastener separate, thereby allowing the jewel box body 45 to fall open by gravity. The notch 34 and recess fastener are located between the jewel box cover 37 and the jewel box body 45 near the front portion of the jewel box 15. The recess is located on the jewel box body 45. The jewel box cover 37 flexes under the slight finger tip pressure, causing the jewel box cover 37 sides to flare out near the front of the jewel box cover 37, separating the notch 34 and the recess. The jewel box can also be opened by simply pushing the jewel box body 45 from the jewel box cover 37.

The jewel box body 45 comes to rest on the support dowel 44. The angle at which the jewel box body 45 is thereby situated provides easy access to the compact disc 38. The open sides 7 and the front 25 allow easy extraction and return of the compact disc 38. The two rear latch assemblies 23 and the two front latch assemblies 23 are at an incline with respect to the front and back, just as is the ceiling, thereby positioning the front lip edge of the jewel box cover 37 up high enough to provide easy visibility of the compact disc 38 to a user looking downward at the unit. By grasping the edges of the compact disc 38 at two diametrically opposite points, the user may remove the compact disc 38 from the holding member 42 by lifting one point first, causing the holding member 42 to release the 25 compact disc 38. This is a known way of extracting the compact disc 38 from the jewel box body 45. The jewel box body 45 does not move away from the supporting pole 44 because a net downward force is applied on the jewel box body 45 while extracting the compact disc 38. When returning the compact disc 38 to the holding member 42, pressure is applied to the midsection of the jewel box body 45 near the holding member 42. The support pole 44 situated under the front portion of the jewel box body 45 along with the back guide pole 24 located against the rear edge 36 of the jewel box body 45, accept the pressure during the return of the compact disc 38.

The clip 9 is curved on the edge 11 facing the rear. When the jewel box 15 is closed and pulled in the direction away from the back guide pole 24 and parallel to the incline of the latched jewel box cover 37, the curved edge 11 of the clip 9 slides off the back edge of the slot 17. This forces each clip 9 to retract toward the side walls 28 in a direction indicated by the arrow 12. Each slot 17 moves forward of each respective latch assembly 23 until the clips 9 are on the sides of the jewel box cover 37 at the area behind each slot 17. The jewel box 15 is now free of the grasp of the latch assemblies 23.

The holes in the side boards for the connections of the dowels and latch assemblies are short of penetrating the exterior surface of the boards (i.e. they are blind holes). This feature allows for a finished surface of the exterior, being appealing in a wood design of the preferred embodiment for aesthetic reasons.

Whereas the preferred embodiment includes a ceiling and a shelf, usually considered to be substantially horizontal, and the operation of gravity on opening the jewel box, the functional elements are not restricted to a specific orientation of space. The latches, a significant part of the invention, will function the same in any orientation and with or without gravitational forces. The latches need not be mounted on opposing walls, as described, but may be projections from a planar surface. Also, the latch assemblies may number two, being oppositely disposed, and still provide some the benefits of the invention but with less stability of the jewel box grasped by four latch assemblies.

The latch assemblies work on the same principals as does a spring backed latch, used in doors for example, but do not have the direct manual control to release the latch. This release is realized by the beveled edge of the latch. Many modifications of these catch members may be accomplished in light of the above teachings. The foregoing description of the preferred embodiment describes a unit of simple yet effective construction. Different representations of the invention can be realized with different materials.

A plastic design would be desirable for the relatively inexpensive cost of manufacture and the light-weight option particularly appealing for portable units. The side walls, ceiling, back guide and support could conceivably be included in one single mold of plastic. The latches could also be molded into the unit or mounted by known means. The latch member does not have to be resilient in that it can for example be a rigid piece backed by a spring member and pivoted on a hinge.

It will nevertheless be understood that no limitations of the preferred mechanics of the invention are thereby intended. Alterations and modifications of the illustrated device would normally occur to one skilled in the art when the invention is adapted to one of the many different dispositions for which it can be utilized.

What I claim is:

1. An apparatus for manipulating a jewel box to assist in the opening and closing of said jewel box, thereby allowing the extraction and return of a compact disc stored therein, said prior art jewel box comprising:

a shallow rectangular box having a body adapted to releasably hold within it a compact disc, a cooperating rectangular lid having slots paired on opposite edges thereof and being hingedly attached to said body at substantially a third edge, the fourth edge being referred to as the lip edge, and a detent mechanism operatively positioned at mating surfaces of said body and said lid to releasably retain said lid in a closed position; and said apparatus comprising:

a plurality of oppositely disposed paired catch members supported in a substantially horizontal plane and adapted to selectively engage and release said slots in said lid, thereby to selectively either support said jewel box by its lid therebetween or release said jewel box, the selection being made at the discretion of the user by manually imposing appropriate movement of said box relative to said catch members for engagement or release thereof;

wherein while said jewel box is supported by said catch members, light pressure on the center of the lip edge of said lid causes said cover to flex in a way to release said detent mechanism, thereby allowing said body of the box to open away from said lip by pivoting on said hinged attachment, thus allowing access to a compact disc stored within.

2. The apparatus of claim 1, wherein at least one catch member in each pair of said paired catch members comprises a spring biased latch that is beveled in two directions:
   a beveled face of said latch that causes retraction of said latch during the insertion of said jewel box between an opposing pair of said catch members in a motion substantially parallel to the thickness of said box until said latch engages said slot, thereby providing support means for said box, and
   a beveled edge of said latch that causes retraction of said latch when said jewel box is moved in a direction lateral to the thickness of said box, thereby providing a release means for said box.

3. The apparatus of claim 1, wherein said catch members are supported by being mounted on the opposing inner faces of two parallel walls that are held in spaced parallel relationship by at least one interconnecting member.

4. The apparatus of claim 3, wherein at least one interconnecting member forms a ceiling above said catch members that prevents upward motion of said jewel box beyond a position at which said catch members engage said slots.

5. The apparatus of claim 4, wherein said interconnecting member forming a ceiling also serves on its upper surface as a shelf for storing thereon a plurality of jewel boxes, between said parallel walls.

6. The apparatus of claim 3, further comprising a rear guide member adapted to engage said third edge of said jewel box lid to aid in positioning said jewel box during the insertion of said jewel box between said catch members.

7. The apparatus of claim 3, wherein said interconnecting member is unitary with said walls.

8. The apparatus of claim 1, wherein a mechanical stop means is provided to, in cooperation with said hinged attachment of said body to said supported lid, hold the released said body at a preferred angle for said access.

9. A combination comprising a jewel box and an apparatus for assisting in the opening and closing of said jewel box, thereby allowing the extraction and return of a compact disc stored therein, said prior art jewel box comprising:
   a shallow rectangular box having a body adapted to releasably hold within it a compact disc, a cooperating rectangular lid having slots paired on opposite edges thereof and being hingedly attached to said body at substantially a third edge, the fourth edge being referred to as the lip edge, and a detent mechanism operatively positioned at mating surfaces of said body and said lid to releasably retain said lid in a closed position; and
said apparatus comprising:
   a plurality of oppositely disposed paired catch members supported in a substantially horizontal plane and adapted to selectively engage and release said slots in said lid, thereby to selectively either support said jewel box by its lid therebetween or release said jewel box, the selection being made at the discretion of the user by manually imposing appropriate movement of said box relative to said catch members for engagement or release thereof;
   wherein while said jewel box is supported by said catch members, light pressure on the center of the lip edge of said lid causes said cover to flex in a way to release said detent mechanism, thereby allowing said body of the box to open away from said lip by pivoting on said hinged attachment, thus allowing access to a compact disc stored within.

10. The combination of claim 9, wherein a mechanical stop means is provided to, in cooperation with said hinged attachment of said body to said supported lid, hold the released said body at a preferred angle for said access.

11. The apparatus of claim 9, wherein at least one catch member in each pair of said paired catch members comprises a spring biased latch that is beveled in two directions:
   a beveled face of said latch that causes retraction of said latch during the insertion of said jewel box between an opposing pair of said catch members in a motion substantially parallel to the thickness of said box until said latch engages said slot, thereby providing support means for said box, and a beveled edge of said latch that causes retraction of said latch when said jewel box is moved in a direction lateral to the thickness of said box, thereby providing a release means for said box.

12. The combination of claim 9, wherein said catch members are supported by being mounted on the opposing inner faces of two parallel walls that are held in spaced parallel relationship by at least one interconnecting member.

13. The combination of claim 12, wherein said interconnecting member is unitary with said walls.

14. The combination of claim 12, wherein at least one interconnecting member forms a ceiling above said catch members that prevents upward motion of said jewel box beyond a position at which said catch members engage said slots.

15. The combination of claim 14, wherein said interconnecting member forming a ceiling also serves on its upper surface as a shelf for storing thereon a plurality of jewel boxes, between said parallel walls.

16. The combination of claim 12, further comprising a rear guide member adapted to engage said third edge of said jewel box lid to aid in positioning said jewel box during the insertion of said jewel box between said catch members.

* * * * *